Nov. 25, 1941.    W. A. RAY    2,263,819
VALVE OPERATING MEANS
Filed Nov. 5, 1938    3 Sheets-Sheet 1
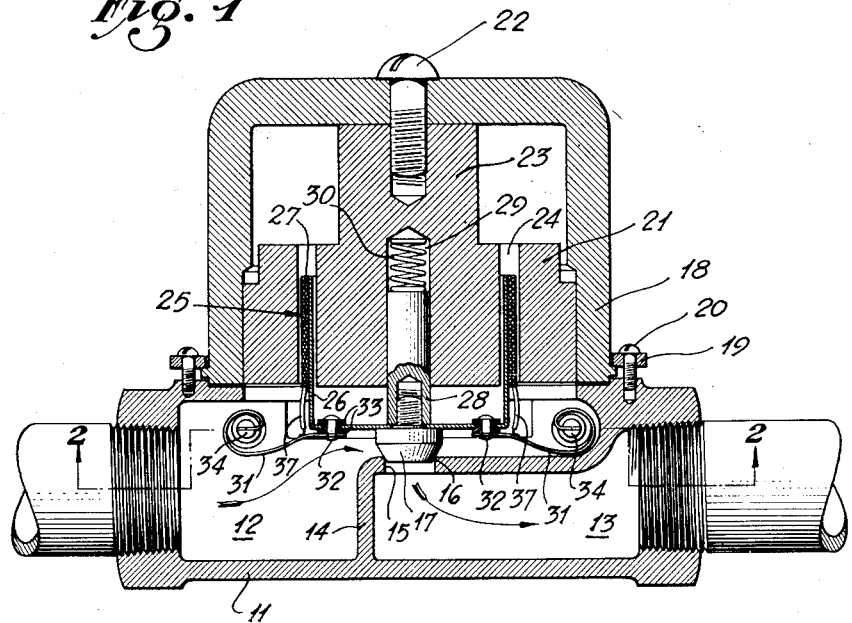
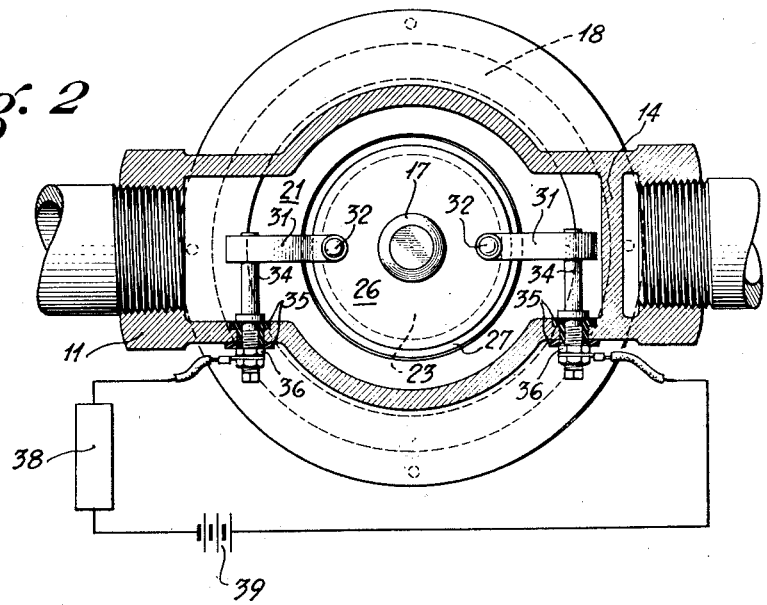
WILLIAM A. RAY,
INVENTOR
BY John H. Rouse
ATTORNEY

WILLIAM A. RAY,
INVENTOR

BY John H. Rouse

ATTORNEY

Nov. 25, 1941. W. A. RAY 2,263,819
VALVE OPERATING MEANS
Filed Nov. 5, 1938 3 Sheets-Sheet 3

WILLIAM A. RAY,
INVENTOR
BY John H. Rouse.
ATTORNEY

Patented Nov. 25, 1941

2,263,819

UNITED STATES PATENT OFFICE 2,263,819

VALVE OPERATING MEANS

William A. Ray, Glendale, Calif.

Application November 5, 1938, Serial No. 239,188

3 Claims. (Cl. 175—340)

My present invention relates to electrical operators for fluid control valves.

A chief object of my invention is the provision of novel valve operating means, comprising an electrical conductor positioned in a unidirectional magnetic field and operatively connected to a valve member for moving the same when said conductor is energized by passage of direct current therethrough.

A further object of the invention is the provision of a sensitive valve operator in which a movable coil is positioned in an air gap formed in a magnetic circuit, including a permanent magnet.

A further object of the invention is the provision, in a valve operator, of opposed biasing means for a movable coil, which means may also be utilized for conducting current to the coil, whereby high conductivity, along with low spring rate, may be attained.

A still further object of the invention is the provision of flexible diaphragm means for shielding parts of the valve operating means from undesirable components of the fluid controlled by the valve and including means for conducting current to the movable coil.

Other objects and advantages of the invention will be found in the description, the drawings and the appended claims.

For a complete understanding of the invention, reference may be had to the following detailed description and accompanying drawings, in which Figure 1 is a sectional view of a valve embodying my invention;

Figure 2 is a section taken on the irregular line 2—2 of Fig. 1, together with a diagrammatic representation of an electric circuit for the valve;

Figure 3:
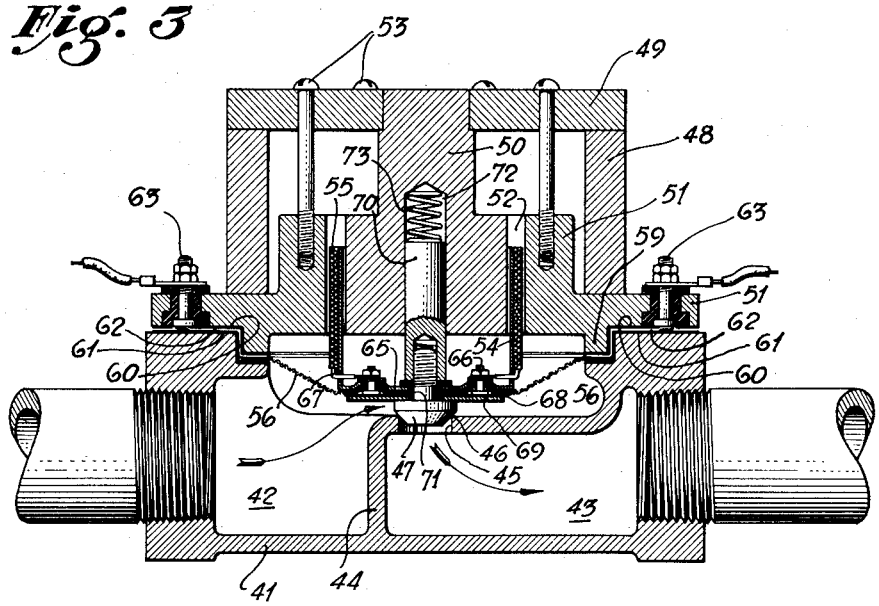
Figure 3 is a sectional view of a modified form of valve embodying features of my invention.
Figure 4:
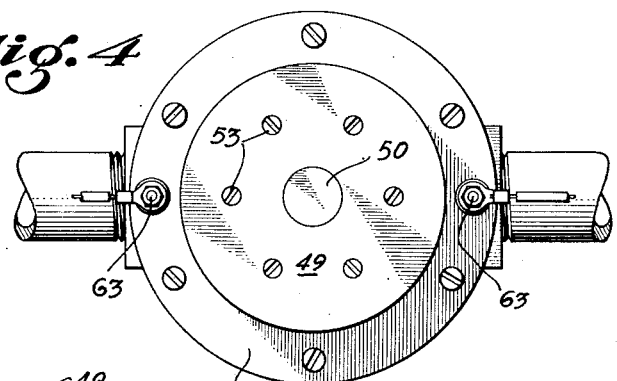
Figure 4 is a plan view of the valve shown in Fig. 3.
Figure 5:
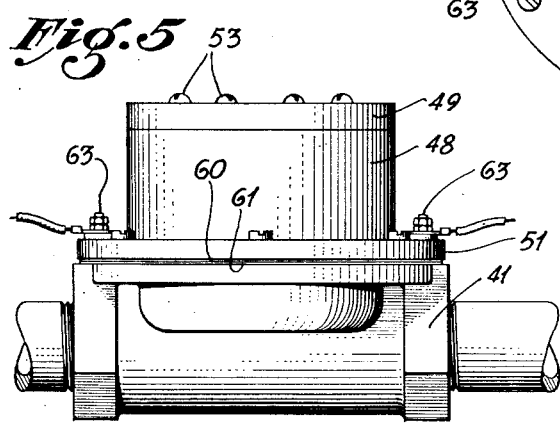
Figure 5 is a side elevation of the same valve.

In Figs. 1 and 2 of the drawings, the numeral 11 denotes a valve casing having an inlet 12 and an outlet 13 separated by a partition 14 having a valve port 15 and a valve seat 16. Cooperable with the seat 16, to control fluid flow through the valve, is a valve member 17.

Covering an opening in the upper wall of the casing 11 is an inverted cup shaped member 18 of magnetic material secured to the casing by a ring 19 and screws 20. A hollow cylindrical member 21 of magnetic material is secured in intimate contact with the lower inner side wall of the member 18, as by press fitting. Secured to the inner end wall of the member 18, by screw 22, is a cylindrical magnetic core member 23. The inner wall of the member 21 and the outer wall of the enlarged lower end portion of the core 23 are accurately machined to form an annular air gap 24 in which is freely slidable a coil assembly, generally indicated by the numeral 25, and comprising a cup shaped supporting member 26 and a coil 27 of electroconductive material insulatingly secured thereto, as by a suitable adhesive. The upper end portion of the valve member 17 extends through a concentric opening in the bottom wall of the supporting member 26 and threadedly supports a cylindrical guide member 28, of non-magnetic material, freely slidable in a concentric cylindrical opening 29 formed in the core member 23.

A compression spring 30 urges the guide 28 downward and, therethrough, the valve member 17 to normally close the valve. Torsional spring members 31, having their inner end portions insulatingly secured to the coil supporting member 26 by rivets 32 and washers 33, are supported by studs 34 extending through openings in the side wall of the casing and insulated therefrom by washers 35. The studs 34 may be locked in position, after rotational adjustment of the torsional springs, by nuts 36.

The ends of the coil 27 are electrically connected to the spring members 31 by leads 37 soldered thereto. The studs 34 consequently also serve as terminals for external connection of the coil in an electrical circuit, such as that shown in Fig. 2, and comprising a limit control or switch 38 and a source of direct current 39.

The magnetic circuit of the operating device consists of the members 18, 21 and 23 and the air gap 24. An energizing coil surrounding the upper end portion of the member 23 may be employed to produce the magnetic flux. However, I prefer to use permanent magnetic material of high coercivity for one or more of the magnetic members. As, in general, such material is difficult to machine and must be cast to shape, it is more conveniently employed in the cup shaped member 18.

The coil 27 may consist of one or more layers of wire depending mainly upon the source of direct current employed, which may be a conventional battery, an alternating current rectifying device or a thermoelectric generator.

The forces of the compression spring 30 and the torsional springs 31 are arranged in opposition to one another so that the latter may be of relatively heavy construction and so may conduct current to the coil without appreciable loss, which is of particular importance when only a limited supply of power is available, as when a thermoelectric generating device is employed. Also, by this arrangement, a low spring rate (change of resistance through displacement) is attained. The opposing spring biases are so arranged that the valve is normally closed.

The operation of the device depends upon the well known motor principle of a conductor positioned in a magnetic field whose lines of force are transverse to the direction in which movement of the conductor is desired. When current is passed through the coil in the proper direction with respect to the direction of the field, the coil, and therewith the coil supporting means and the valve member, will move upward, opening the valve.

By employing magnetic material of high coercivity and with careful arrangement of parts, a sensitive and efficient valve operator can be produced.

In Figs. 3-7 I have shown a modified form of valve according to my invention which comprises a casing 41 having an inlet 42 and an outlet 43 separated by a partition 44 having a valve port 45 and a valve seat 46. A valve member 47 cooperates with said seat to control fluid flow through the valve.

Secured to the valve casing and covering an opening in the upper wall thereof is a magnetic assembly comprising a hollow cylindrical member 48 of high grade permanent magnet material and having accurately ground upper and lower end surfaces, a disk 49 of soft iron, into an opening in the center of which is pressed the upper reduced end portion of a cylindrical soft iron core member 50, and a soft iron base member 51 having an inner upwardly formed hollow cylindrical portion surrounding the enlarged lower end portion of the core 50 and defining therewith an annular air gap 52. The assembly is secured together by screws 53.

Freely slidable in the air gap 52 is a coil assembly comprising a cup shaped supporting member 54 and a coil of insulated wire 55 insulatingly secured thereto by a suitable adhesive.

A flexible diaphragm member 56 is provided to screen the upper portion of the valve, which comprises the magnetic and coil assemblies, from harmful components of the fluid controlled by the valve, such as the dirt which is usually present in artificial or natural gas and components of such gases which tend to form gummy deposits.

Figure 7:
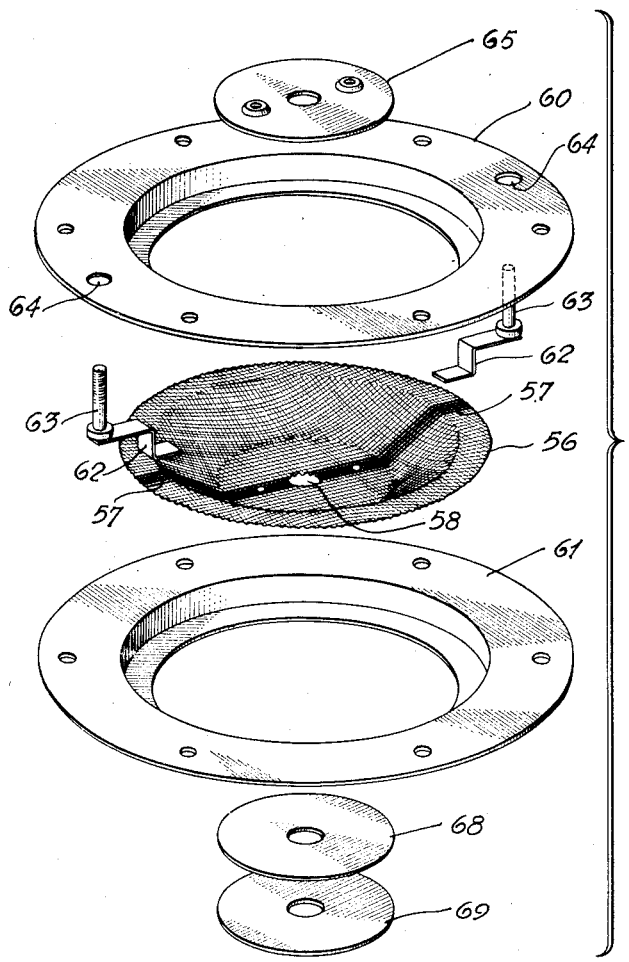
Figure 7 is an exploded perspective view of the elements composing the assembly shown in Fig. 6.
Figure 6:
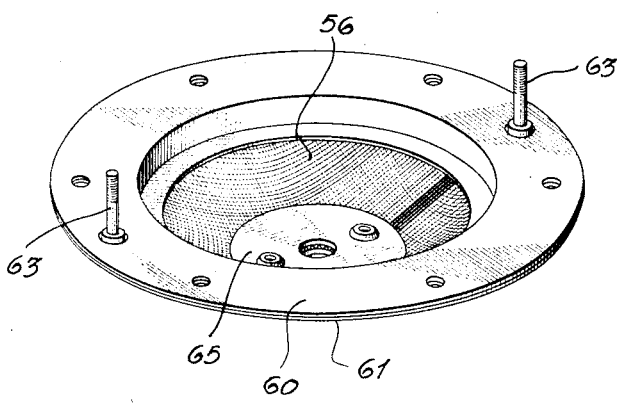
Figure 6 is an enlarged perspective view of the diaphragm assembly of Fig. 3.

The diaphragm, as shown in Fig. 7, is of fluid permeable fabric having a narrow conducting strip 57 of fine wire woven therein and divided at the center by the hole 58. Under some conditions the diaphragm may preferably be made of impermeable material such as thin leather or rubber having a conducting strip of foil adhered to the upper surface thereof. Thin metal may also be employed for the diaphragm, a conducting strip being insulatingly adhered to its upper surface.

The diaphragm is secured between the downwardly extending ring portion 59 of the member 51 and the valve casing and is insulated from contact with these members by washers 60 and 61 which are arranged on opposite sides of the diaphragm.

In contact with the outer upper end portions of the conducting strip 57 and between the insulating washers 60 and 61 are conducting members 62 of thin metal, to the outer end portions of which are secured, as by solder, terminal screw members 63 which extend through holes 64 in the upper insulating washer and are insulatingly secured in the member 51 as shown.

The central portion of the diaphragm is secured to the bottom wall of the coil supporting member 54, with an insulating washer 65 therebetween, by terminal screws 66, the heads of which serve to electrically connect the end leads 67 of the coil 55 to opposite end portions of the conducting strip 57. It will be seen that an electric circuit is formed through terminals 63, conducting members 62, conducting strip 57, and terminals 66 to opposite ends of the coil 55. Below the portion of the diaphragm which is secured to the coil supporting member is an insulating washer 68 and a stiffening metal washer 69. The reduced upper end portion of the valve member 47 extends through the assembly described in this paragraph and is screwed into a cylindrical guide member 70, binding the assembly together. An insulating sleeve 71 prevents possible contact of the inner ends of the conducting strip 57 with the valve member.

The guide member 70 is of non-magnetic material and is freely slidable in a concentric cylindrical opening 72 formed in the core member 50. A compression spring 73 urges the guide member 70 downward and, therethrough, the valve member 47 to normally close the valve. The guide member 70 is not an essential element of the invention, especially when such forms of diaphragms are employed which may in themselves serve as guide means for the coil assembly.

The electrical operation of the valve operating means of Fig. 3 is, of course, identical with that of the form shown in Figs. 1 and 2.

While I have herein disclosed preferred embodiments of my invention, it is to be understood that modifications may be made therein without departing from the spirit of my invention and that I am therefore to be limited only by the scope of the appended claims.

I claim as my invention:

1. In an electromagnetic operator: a casing of magnetic material providing an annular air gap, a solenoid coil of hollow cylindrical form reciprocable in said air gap, means for supporting said coil at one of its ends, a flexible diaphragm of fluid permeable insulating material connected to said coil supporting means and joined at its margin to said casing, and current conducting means for said coil comprising a metallic strip woven in said material, said strip extending substantially centrally across the diaphragm and being disrupted centrally to provide a pair of conductors extending toward said casing from opposite sides of the coil supporting means.

2. In an electromagnetic operator: a casing of magnetic material providing an annular air gap, a solenoid coil of hollow cylindrical form reciprocable in said air gap, means for supporting said coil at one of its ends, a flexible diaphragm of fluid permeable insulating fabric connected to said coil supporting means and joined at its margin to said casing, and current conducting means for said coil comprising metallic strands woven in said fabric to form a strip extending substantially centrally across the diaphragm, said diaphragm having a central opening dividing said strip into a pair of conductors extending from opposite sides of said coil supporting means toward the casing.

3. In an electromagnetic operator: a casing of magnetic material providing an annular air gap, a solenoid coil of hollow cylindrical form reciprocable in said air gap, means for supporting said coil at one of its ends, a flexible diaphragm of fluid permeable insulating fabric connected to said coil supporting means and joined at its margin to said casing, current conducting means for said coil comprising a metallic strip woven in said fabric and extending substantially centrally across the diaphragm, said diaphragm having a central opening dividing said strip into a pair of conductors each of which extends outwardly toward the casing from an opposite side of said coil supporting means, and a pair of terminals mounted on said casing and at least one of which is insulated therefrom, each of said terminals having a lug portion engageable with an outer end portion of one of said conducting strips.

WILLIAM A. RAY.